(12) United States Patent
Jalkanen

(10) Patent No.: US 7,249,800 B2
(45) Date of Patent: Jul. 31, 2007

(54) CHAIR FOR ELIMINATION OF PROBLEMS OF SEDENTARY ORIGIN

(75) Inventor: Veli-Jussi Jalkanen, Rautalampi (FI)

(73) Assignee: Easydoing Oy, Rautalampi (FI)

( * ) Notice: Subject to any disclaimer, the term of this patent is extended or adjusted under 35 U.S.C. 154(b) by 116 days.

(21) Appl. No.: 10/641,735

(22) Filed: Aug. 15, 2003

(65) Prior Publication Data

US 2005/0173951 A1 Aug. 11, 2005

Related U.S. Application Data

(63) Continuation-in-part of application No. PCT/FI02/00119, filed on Feb. 14, 2002.

(30) Foreign Application Priority Data

Feb. 15, 2001 (FI) ............................... U20010074
Aug. 23, 2001 (FI) ............................... U20010324

(51) Int. Cl.
*B62J 1/00* (2006.01)

(52) U.S. Cl. .............. 297/201; 297/195.1; 297/195.11; 297/215.15; 297/202

(58) Field of Classification Search ............. 297/195.1, 297/195.11, 215.15, 201 OR, 202
See application file for complete search history.

(56) References Cited

U.S. PATENT DOCUMENTS

| 537,376 | A | * | 4/1895 | Wright ........................ 297/201 |
| 606,818 | A | * | 7/1898 | Bst ............................. 297/201 |
| 608,089 | A | * | 7/1898 | Wellman .................... 297/312 |
| 2,156,629 | A | | 5/1939 | Hutchison ................... 155/182 |
| 4,387,925 | A | * | 6/1983 | Barker et al. ................ 297/201 |
| 5,123,698 | A | * | 6/1992 | Hodges ....................... 297/201 |
| 5,580,128 | A | | 12/1996 | Johnson et al. ............. 297/314 |
| 5,988,740 | A | * | 11/1999 | Caraballo .................... 297/201 |
| 6,209,954 | B1 | * | 4/2001 | Bombardier ................ 297/201 |
| 6,290,291 | B1 | * | 9/2001 | Kojima ....................... 297/201 |
| 6,357,825 | B1 | * | 3/2002 | Bavaresco ................... 297/201 |

FOREIGN PATENT DOCUMENTS

| DE | 29804217 U1 | 7/1998 |
| WO | WO-96/22715 A1 | 8/1996 |
| WO | WO-00/2470 A1 | 1/2000 |

* cited by examiner

*Primary Examiner*—Laurie K. Cranmer
(74) *Attorney, Agent, or Firm*—Harrington & Smith, PC

(57) ABSTRACT

The present invention relates to a chair for eliminating problems of sedentary origin, which chair consists a saddle-shaped seat part (13) supporting the pelvis and the thigh muscles of the seated person which seat part has two curved thigh troughs (113, 115), which both have a bottom section (101, 102) and its opposite sides there is an inner side section (103 and 104) and outer side section (105 and 106) in relation to the other thigh trough, and which mentioned sections form lengths (L) to the mentioned thigh troughs and within this length there are front sections (107) and back sections (108) for the thigh troughs; when the inner side sections rise from their front sections towards each other, thus forming a central ridge (110) longitudinal to the seat part and mentioned back sections form a back section (A), where from the mentioned lengths reach down-wards and at the same time away from each other. In the chair according to the invention the thigh troughs (113, 115) are at least two separate parts (3, 5) between of which there is a central opening (20) parallel with the mentioned central ridge (110).

7 Claims, 3 Drawing Sheets

CHAIR FOR ELIMINATION OF PROBLEMS OF SEDENTARY ORIGIN

CROSS-REFERENCE TO RELATED APPLICATIONS

This is a continuation-in-part patent application of International Application No. PCT/FI02/00119 filed Feb. 14, 2002, which is hereby incorporated by reference in its entirety; and which claims priority to Finnish Patent Application No. U20010074 filed Feb. 15, 2001 and Finnish Patent Application No. U20010324 filed Aug. 23, 2001.

FIELD OF THE INVENTION

The present invention relates to a chair for the elimination of problems of sedentary origin, which chair consists a saddle-shaped seat part supporting the pelvis and thigh muscles, which saddle-shaped seat part includes thigh troughs, which have been formed by means of side parts curving downwards at an angle from the middle of the seat part, which thigh troughs have been arranged to direct a seated person to sit with thigs slightly apart, and in an angle downwards, and legs reaching at an angle forwards.

BACKGROUND OF THE INVENTION

When sitting on current chairs there is a problem that the pelvic area, hip joints and knee joints are in an approximately 90 degrees angle. Calf and thigh, and correspondingly thigh and back are at an approximately 90 degrees angle in respect with each other. Therefore, also the warm thighs of the seated person are together and the space between the thighs, the pelvic area, the lower part of the thighs and genitals are unphysiogically under pressure and in high temperature. When sitting on upholstered chairs, air circulation in the pants is bad and the temperature of the testes increases. The use of a belt and keeping the belt tight puts pressure on the stomach and pelvic muscles. Air circulation inside the pants becomes worse because of earlier mentioned reasons, which accelerates the accumulation of body heat in the groin area. This is the reason why testes are in too high temperature, and the quantity and the quality of sperm decreases. The normal production of sperm and its fertility requires a few degrees, about 3-4° C., lower temperature compared with the normal body temperature about 37° C. When sitting on current chairs a seated person often droops in a heap because the back and shoulders curve forward which partially prevents and might weaken the functioning of lungs, which causes exhaustion. Furthermore, it is not easy to move on a current chair, but moving is, at it's best, clumsy. In addition, the problem is that sitting on current chairs induces to the mechanism of the back (lower, middle and neck/shoulder area) incorrect positions for the majority of the seated people, and various sitting oriented disorders (SOD). These also include the increased progress and worsening of the general knee arthrosis.

On account of information above, saddle chairs have been developed in order to decrease above-mentioned problems of sedentary origin. As an example of these kinds of saddle chairs there is a solution described in PCT-application PCT/FI99/00621. In these saddle chairs there is a one-part saddle-shaped seat part, on which the seated person sits in a natural position with legs in an angle forwards. The seat part of saddle chairs includes wide, relatively even and common back part of the seat part, on which back part the buttocks are while sitting on the chair, and on which back part the seat bones rest on. In the center of the back part there is a middle part, which reaches from the back part to the front part of the seat part, which middle part is mainly on the level of the back part. The middle part located at the front of the back part is between the legs while sitting down. The saddle chair also includes side parts on both sides or so called thigh troughs which reach from the back part of the seat part and the middle part of the seat part and curve downwards, and the shape of thigh troughs is curved and concave when viewed form the crosswise direction of the chair. The thigh troughs are at an approximately 90 degrees angle in respect of each other, and they direct seated person to sit thigs in an angle downwards, and legs reaching at an angle forwards. Saddle chairs are usually of relatively small size and they take relatively little space with regard to conventional chairs. They are also easy to move about, and they are easy to quickly sit on and rise from. Saddle chairs, their structure and use differs clearly from the so-called conventional chairs. While sitting on a saddle chair, the sitting position is more behind, and the pelvis is more in an upright position than in conventional chairs while seated. The weight of the sitting area is on different areas than in conventional chairs. The weight is focused on the seat bones, and the weight is more in the back and middle area of the seat. As a result, for males, the weight is focused more in the lower part of the pelvis and, thus, on the area of penis and testes because the sitting position of the pelvis is more upright that normally.

The one-part seat of current saddle chairs causes, however, certain problems in males' comfort and health. Based on research it is commonly known that a saddle of male cyclists may cause impotence and scrotal tumour. Male users of one-part saddle chairs have given critical feedback. The reputation of saddle chairs of being unphysiological and uncomfortable seats prevents, for its part, the way of sitting in question to spread among men and thus the benefits of the whole way of sitting does not reach males avoiding saddle chair.

In current saddle chairs the penis, root of penis and testes may appear in any case under greater pressure, for example, than when conventionally sitting down and, thus, appear under even greater pressure while the pelvis is been bent while turning forwards or stretching. Furthermore, especially on males problems may cause while sitting the constant pressure on urethra, which may cause urology problems. Some people may suffer from earlier broken and therefore sore coccyx, so it is difficult for them to sit on current chairs. Also persons with haemorrhoids may find it difficult to sit on current chairs.

SUMMARY OF THE INVENTION

The object of the invention is to provide a chair to eliminate problems of sedentary origin, which occurred with earlier recognized technique. Especially, the object of the invention is to provide an advantageous application and chair with regard to comfortableness and health.

These have been achieved by means of the chair in accordance with the invention.

The chair in accordance with the invention is characterized in that side parts are formed of at least two parts, between which a central opening longitudinal with the seat part is formed. The central opening is in the center of the seat part and reaches backwards from the front part of the seat part.

In the chair according to the invention the support for sitting is obtained from the least harmful place with regard to physiology or the so called seat bones of the pelvis, and with advantageous angles of the thigh angles the pelvis is directed to stay upright while sitting down without active and conscious muscle work in the area of pelvis and lower back. This makes it possible to obtain the maintenance of good posture and the beneficial effects caused by it. The inventions is advantageous also in the respect that is causes less unwanted pressure and positions in the thigh and pelvic areas compared to other chairs.

The advantage of the invention appears to be especially that by means of the chair in accordance with the invention, it is possible to eliminate the pressure on the lower thighs, bending of pelvis backwards as in conventional sitting, and in case of males, the pressing effect of the frame of the chair and the upholstery to the male genital organs (testes, the root of penis and penis) and, thus, eliminate the inconvenience and health risks due to those. It is also possible to eliminate the pressing effect to urethra and the part of the penis under the pelvic area during sitting, thus preventing the feelings of uncomfortability and health risks created by the earlier mentioned reasons. By means of the invention the temperature of the testes may be kept near 33° C., which is regarded as optimum, and thus the fertility of the spermatozoa is not jeopardized with too high temperatures.

The chair in accordance with the inventions is also well suitable for females. The advantage of the invention is, furthermore, that the chair applying the method is very simple by construction and versatile by properties and thus the user of the chair may simply and quickly adjust the supporting properties of the seat part to meet his or her dimensions and clothing. Also persons with either sore coccyx or haemorrhoids may easily sit on the chair according to the invention, as the pressure in the middle part of the seat is less than in earlier recognized seats.

In advantageous application of the invention the side parts are formed of at least two separate parts. These parts may easily be joined to each other.

In the next advantageous application of the invention the central opening is formed bigger in the front part of the seat part than in the back part. Thus, the seated person is guided to sit in wide position, air circulation is increased and the tissues in that area are cooled.

In the next advantageous application of the invention side parts are joined to each other stationary. Thus, they form a saddle-shaped chair with a partial central opening.

In the next advantageous application of the invention side parts are joined to each other adjustable. Thus, the distance between them e.g. the size of the central opening may be adjusted as wanted. Furthermore, the shape of the central opening may, in some application, be adjusted as wanted, and change the central opening such that it is wider in the back part than in the front part, or such that the central opening is wider in the front part than in the back part. Furthermore, the angle of the seat can be adjusted in relation to the horizontal plane. Therefore, each seated person can adjust, in addition to the height of the chair (which affects the important thigh angle), the width of the front and back parts and the angle of the chair to the most pleasant position as regards to own muscles, the width of the seat bones and the corresponding width of the thigh chorde, genital organs and external female genitalia.

BRIEF DESCRIPTION OF THE DRAWINGS

Next, the invention will be explained in more detail with reference to advantageous application examples in the accompanying drawings, to which the invention is not, however, limited. In the drawings

DETAILED DESCRIPTION OF THE PREFERRED EMBODIMENTS

Figure 1:
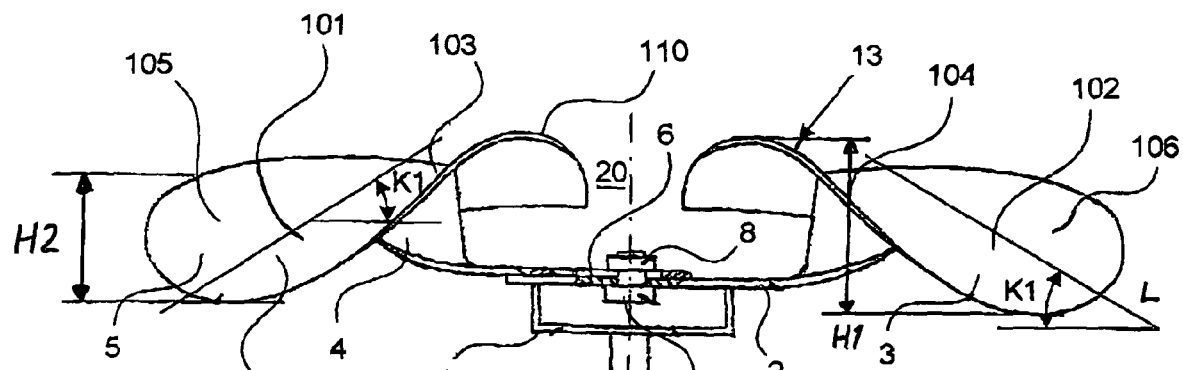
FIG. 1 illustrates an advantageous application example viewed from the front, as seen from direction I of FIGS. 2 and 3, when the central ridge of the seat part is in perpendicular direction against the level of the figure.

FIGS. 1-4 illustrate one advantageous application example of a chair applying the method in accordance with the invention. The chair in accordance with FIGS. 1-4 includes a leg part 12 and a seat part 13 forming a saddle-shaped seat part attached to it. In this application the seat part 13 has been formed of two separate side parts 3, 5, between which an opening longitudinal with the seat part is formed.

The leg part 12 may be, for example, an earlier recognized device such as a leg part of a work chair equipped with rolls with a turning and vertically adjustable gas spring 11 or corresponding device used to adjust the height of the seat part.

Side parts 3, 5 formed of separate parts are formed of plate-shaped parts, making the saddle-shaped form to the seat curving in the upper part and pointing straight downwards in the lower part, so called thigh troughs, which are covered on the outer surface with suitable cushion and surface materials, such as expanded plastic and leather.

As explained above, the chair includes in this case a saddle-shaped seat part 13 supporting the pelvis and the thigh muscles of the seated person, which seat part has two thigh troughs which are curved and concave when viewed from a crosswise direction. In both troughs 113, 115 there is a bottom section 101, 102 and its opposite sides there is an inner side section 103 and 104 and outer side section 105 and 106 in relation to the other thigh trough. The seat part has, thus, inner side sections close to and connected to each other, but only in the area of front part 107 of the thigh troughs, and from these, bottom sections protruding sideways and backwards, which are surrounded by outer side sections. The bottom section and side sections of the thigh troughs are naturally connected to each other evenly curved, and have a suitable width so that the contacting surface to a seated person is smooth and comfortable and suitable in size. In steel frame of the chair the bottom of the thigh trough is straight against the thigh, and slightly convex from the front part because the upholstery arches slightly when the leather is stretched on top of it. Due to the slightly convex thigh trough, there is no sharp, uncomfortable angle against the lower thigh. The bottom sections and side sections form lengths L to the thigh troughs, and within this length the thigh troughs have front sections 107 and back sections 108. The inner side sections 103 and 104 rise from their front sections 107 against each other, thus forming a central ridge 110 longitudinal to the seat part whereas the back sections 108 form a back section A, from which section the said lengths L reach downwards, or during the normal use of the chair almost from horizontal plane in the back section, and from there on reaching downwards. At the same time or coming from the back section forward to front section 107, the thigh troughs 113, 115 are drawn away from each other. The thigh troughs have a back section formed at least by its bottom sections 101, 102, and from there on, a central ridge 110, on the two sides of which and spread apart from each other, the front sections 107 of the thigh troughs reach. The mentioned inner side sections 103, 104 have, at least in the area of the said front sections, a greater first height H1 than the other height H2 on the mentioned outer side sections 105, 106, which height H2 can be very low when the heights are measured in each point in perpendicular direction against bottom sections 101, 102. The first height H1 increases when moving from the front sections of the common back section to the front sections of the thigh troughs.

In accordance with the invention the thigh troughs 113, 115 are at least two different parts 3, 5, between of which there is a central opening 20 parallel with the mentioned central ridge 110. This means that the edges of the thigh troughs pointing against each other have distances the size of widths W1 and W2, which distances can be of standard size or adjustable in accordance with the invention, as explained below.

The lengths L of thigh troughs are directed, with regard to horizontal plane, from their front sections downwards at an angle K1, which is at least 30° and not more than 60°, typically about 45° in size in the area of the mentioned front sections 107 or their front edges 109, but naturally in the back the angle is smaller nearing the angular-value 0° at the point of back section A. The lengths of thigh troughs are directed away from each other at an angle K2 which is at least 70° and typically between 75°-110°. In the central opening 20, at the point of front sections 107 of the thigh troughs, the first width W1 and in the back sections 108 or at the point of the back section A, the other width W2 and this first width W1 can be equal in size as the other width or advantageously greater than the other width W2. The first width W1 in the front is adjustable (typically) between 0 mm-60 mm and the other width W2 typically between 0 mm-25 mm.

Figure 2:
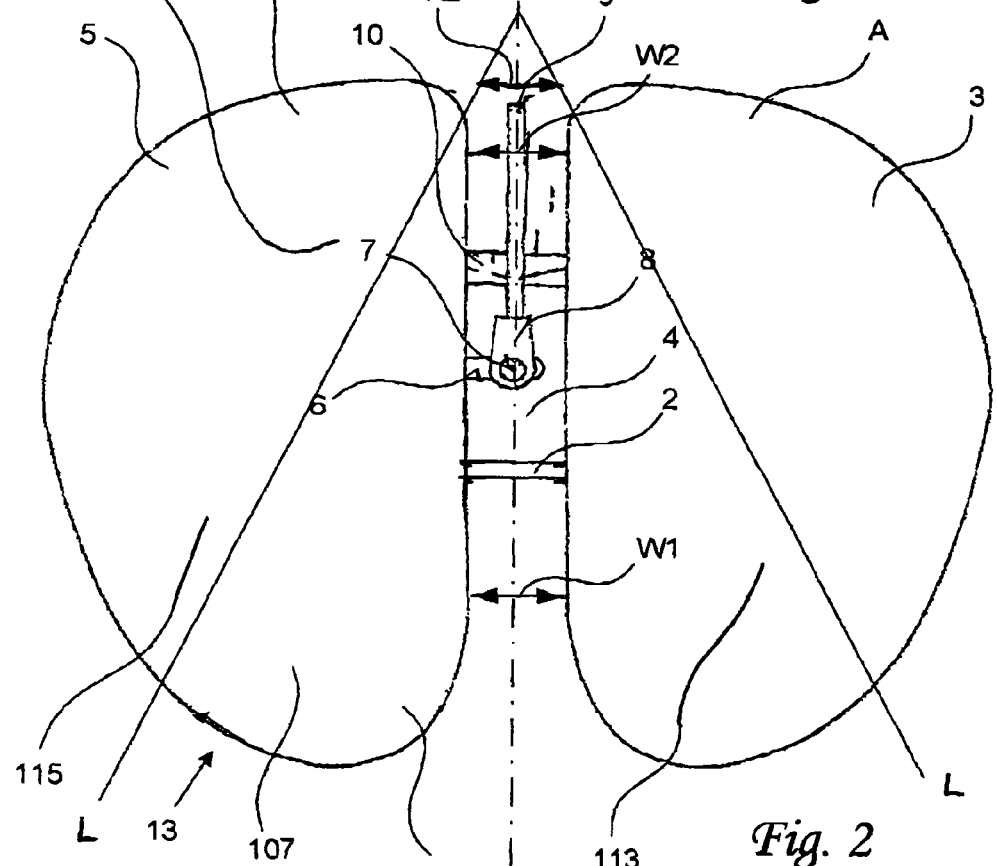
FIG. 2 illustrates an application example in accordance to FIG. 1 viewed from above, as seen from direction ii of FIGS. 2 and 3 when the central ridge of the seat part is upright and the widths are almost horizontal, and from which the protruding of the thigh troughs can be seen.
Figure 3:
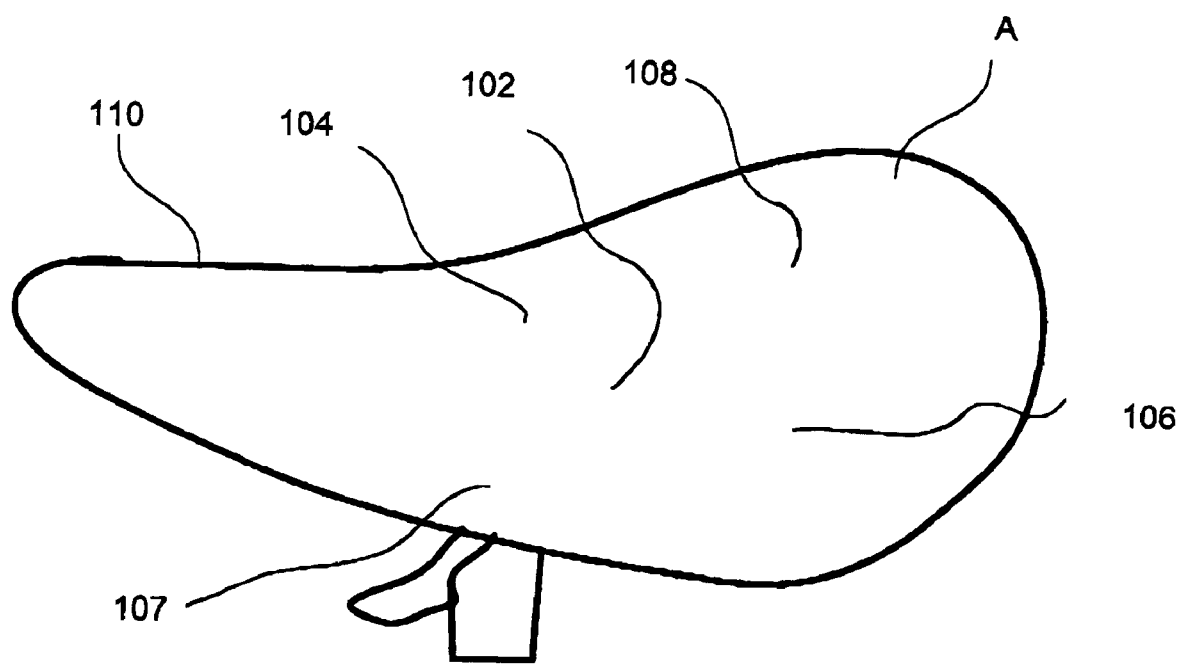
FIG. 3 illustrates an application example in accordance with FIGS. 1 and 2 from the side, as seen from direction III of FIGS. 1 and 2, which shows the curving of the thigh troughs, and the way they reach downwards.

Central opening formed between side parts 3, 5 forms through the seat part a longitudinal space as illustrated in FIG. 2. The width of the space is typically larger in the front part than in the back part for males, and may be, for example, 10-35 mm in the front part. The space may be even by width, but especially advantageous has been noticed to be an application in which the space forming the central opening has been formed larger in the front than in the back part of the seat part. This kind of application has been illustrated in the FIG. 4 with dashed lines.

A seat part formed as mentioned above has been attached to the leg part by means of suitable attaching device 1 and with at least two supporting parts 2, 4 attached to the attaching device and side parts. Construction in application in accordance with FIGS. 1-4 includes, furthermore, an adjusting device 6-10 formed of several separate parts in order to attach the side parts to the attaching device adjustable.

The attaching device 1 mentioned above is a part joining supporting parts 2 and the gas spring 11 together. In the example in accordance with FIGS. 1-4 the attaching device is a simple part made of plate material with U-shaped part, made of enough thick and enough stiff plate material under which web plate a tube like attaching cone of a gas spring extending downwards from the lower edge of the web plate has been attached in order to attach the attaching device to the upper end of the gas spring 11. One of the supporting parts between the side part and the attaching part has been joined to the flange parts of the U-shaped part.

Supporting parts 2, 4 in the application in accordance with FIGS. 1-4 have been made of plate material of suitable thickness and formed such that the part on the side of the attaching device is essentially in horizontal position. While continuing towards side parts 3, 5 they turn from this position upwards into vertical position and widen such, that at the point where they are attached with the seat part they are almost as long as the seat part. Furthermore, at the joining point of the seat parts the ends of the attaching parts have been bent sidewards at an angle in order to reinforce the attachment of the seat parts and to widen the angle of turning of the turning lever in the adjusting device. The supporting part on the right 2, which is a fixed supporting part, has been attached from its attaching device 1 end to the ends of the flange parts of the attaching device under it fixed. The supporting part on the left 4, instead, which is an adjustable supporting part, has been attached from its attaching device end with an adjusting device 6-10 formed of several parts adjustable partially on the fixed supporting part 2.

The adjusting device 6-10 and the locking device 7-9 in it include in the example in accordance with FIG. 1-4 a groove or hole 6, essentially in crosswise direction with the seat part and going through the supporting part in vertical direction, a screw 7 rising from the upper surface of the fixed supporting part 2 at the groove, a nut 8, screwed above the adjustable supporting part 4 to the end of the screw and clamping lever 9 of the nut attached to it as well as a directing device 10 attached to the upper surface of the fixed supporting part. The clamping lever 9 has been attached to the nut 8 movable by means of threads in the end of the lever and on the sides of the nut. Thus the nut may be taken off for example while separating the seat parts. The directing device 10 is in this application a plate object attached to the back wall on the upper surface of the fixed supporting part 2. The front edge of the directing device 10 placed against the back edge of the adjustable supporting part 4 has been cut into V-shape as illustrated in FIG. 2, thus limiting the turning angle of the adjustable supporting part 4 to correspond the angle of its cutting.

Figure 4:
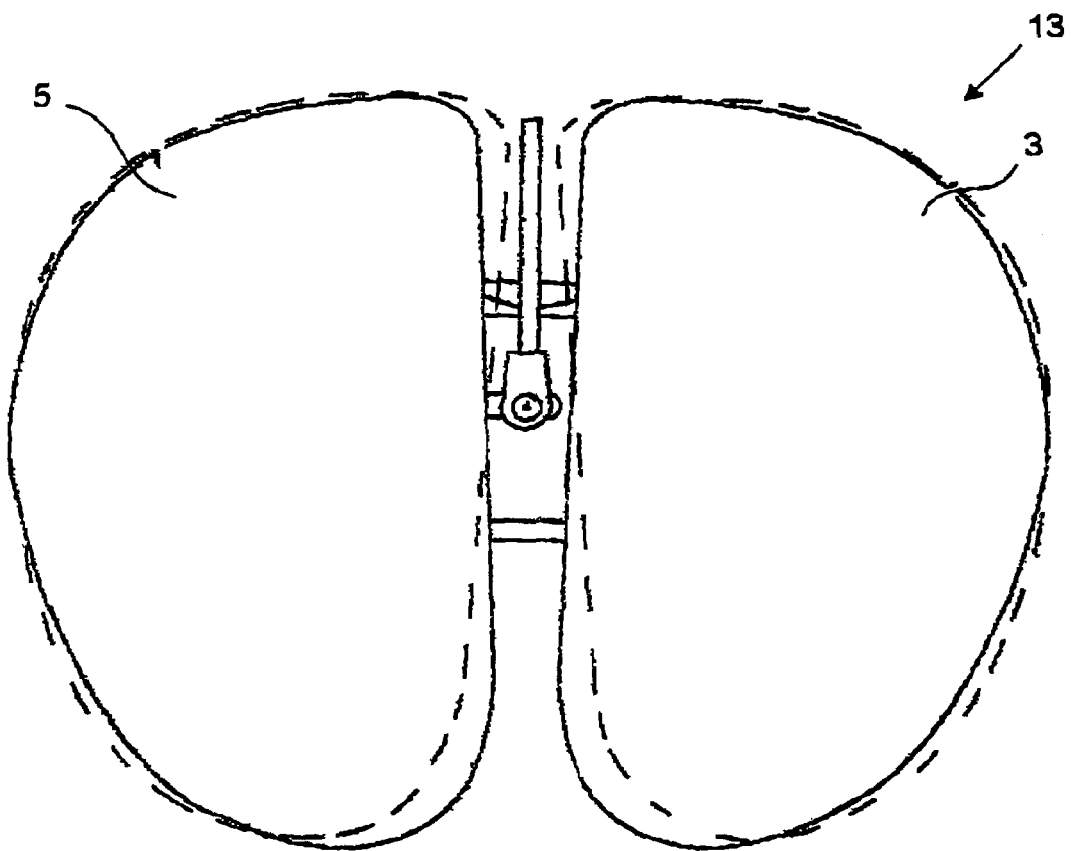
FIG. 4 illustrates a principle drawing of one adjusting possibility of an application in accordance to FIGS. 1 and 2 viewed from above.

Changing the mutual distance between the side parts is realized by opening the nut 8 and moving the adjustable supporting part 4 and the side part 5 to wanted position and so the space functioning as a central opening may be adjusted to be narrower or wider as the dimensions and/or clothing of the user imply. At the same time the position of side parts in respect with vertical axis also may be changed as illustrated in FIG. 4. Let us specify more closely that when the side parts are near each other the degree of the turning angle of the adjustable side part 5 is defined by the distance between the side parts instead of the direction of the diagonal sides of the front edge of the directing device 10, because in this case the side parts turn against each other before the back edge of the adjustable supporting part 4 touches the diagonal front edge of the directing device 10.

In the second application of the invention there are locking holes advantageously directed against each other, and which locking holes are included at least on the other supporting part 2 or 4, several against the mentioned central ridge in crosswise direction. In this case, the adjusting device also consist the above-mentioned locking devices 7, 8, 9, of which at least one goes through the locking holes placed in the mentioned at least two supporting parts.

Figure 5:
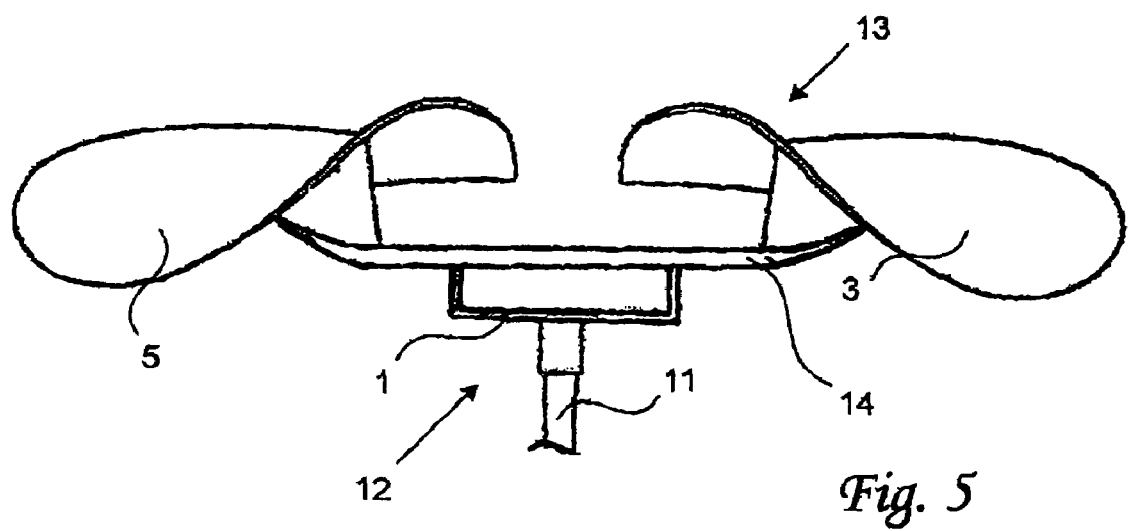
FIG. 5 illustrates another application example of the invention viewed from the front.

In FIG. 5 another advantageous application of the invention has been illustrated. The application in FIG. 5 differs from the application in FIGS. 1-3 only in that the side parts in the application in FIG. 4 have been attached to each other stationary such that between them a space functioning as a central opening is formed. In the application in FIGS. 1-4 the side parts have been attached to each other by the same way, as was mentioned, in principle but adjustable. In FIG. 5 in corresponding places same index numbers as in FIGS. 1-4 have been used. In the application in FIG. 5 the side parts 3, 5 have been attached to each other by means of supporting part 14 made of plate material. The supporting part 14 has been attached to attaching device 1 in a suitable manner, for example by welding joint or the supporting part 14 and the attaching device 1 may be formed to be a solid part made of plate material.

In another application of the invention the side parts of the chair have been attached or joined together from the back parts such, that the back part of the chair is solid. In such application the central opening extends from the front part of the seat part until wanted distance from the back edge of the seat. The central opening may extend, for example, to the center of the seat part or slightly to the backside.

The invention is not limited to the presented advantageous applications but it can vary within the frames of the idea of the invention formed in the claims. Thus it is clear, that the chair in accordance with the invention or its details must not necessarily be as presented in the figures, but other kind of solutions are possible. Supporting of the side parts to each other and to the attaching device as well as the adjusting may be realized completely freely by means of various mechanisms and constructions. When necessary, various extra parts may naturally be added to the chair, such as a back or/and elbow rests, which may advantageously be attached to the attaching device etc. A back and elbow rests may also be equipped with various adjusting devices, by means of which properties of a back and elbow rests may be adjusted suitable to users of various sizes.

The invention claimed is:

1. A chair comprising:
   a saddle shaped seat part comprising:
      a first curved thigh trough comprising:
         a bottom section; and
         a first inner side section and a first outer side section each extending along opposing sides of a first length extending between a first front section and a first back section of said first curved thigh trough;
      a second curved thigh trough comprising:
         a bottom section; and
         a second inner side section and a first outer side section each extending along opposing sides of a second length extending between a second front section and a second back section of said second curved thigh trough;
   a leg part adapted to steadily support the chair on a flat surface, wherein the leg part comprises an upper part;
   an attaching device in said upper part for attaching the leg part with the first curved thigh trough and with the second curved thigh trough;
   a first adjusting device coupled to said leg part for adjusting a height of the seat part; and
   a second adjusting device for adjusting an angle between the first and second lengths, wherein the second adjusting device is adapted to provide a continuous angular range of adjustments between the lengths,
   wherein a first central ridge longitudinal to the seat part is formed of an edge of said first inner side section rising from said first front section towards said second curved thigh trough and a second central ridge longitudinal to the seat part is formed of an edge of said second inner side section rising from said second front section towards said first curved thigh trough, and
   wherein each of said first and second lengths extend away from said first back section and said second back section, respectively, downwards, and away from one another, and
   wherein each of said first curved thigh trough and said second curved thigh trough is separate from the other by a central opening generally parallel with said first central ridge and said second central ridge.

2. The chair according to claim 1 wherein each of said first length and said second length are directed, with regard to a horizontal plane, from said first front section and said second front section, respectively, downwards at an angle not less than 30 and not more than 60.

3. The chair according to claim 1 wherein the first and second lengths are directed away from each other at an angle that is at least 70.

4. The chair of claim 1 wherein said central opening has a first width between said first front section and said second front section and a second width between said first back section and said second back section said first width being greater than said second width.

5. The chair according to claim 1 wherein said second adjusting device is coupled to a first lower section of said first curved thigh trough and a second lower section of said second curved thigh trough for adjusting a width of said central opening.

6. The chair according to claim 1 wherein said first inner side section comprises a first height in an area of said first front section that is greater than another height of said first outer side section.

7. The chair according to claim 1 wherein said second adjusting device is coupled to said attaching device and comprises a first supporting part having a first end and a second supporting part having a second end, oriented crosswise to said leg part, wherein said first end is attached to said first curved thigh trough, said second end is attached to said second curved thigh trough, and said first end and said second end face away from each other.

* * * * *